United States Patent
Bale et al.

(10) Patent No.: US 8,108,853 B2
(45) Date of Patent: Jan. 31, 2012

(54) APPARATUS AND METHOD FOR ALLOWING A FAIL-BACK TO A PRIOR SOFTWARE RELEASE IN A PROCESS CONTROL SYSTEM

(75) Inventors: Sunil S. Bale, Bangalore (IN); Ashish Sharma, New Delhi (IN); Norman R. Swanson, Douglassville, PA (US); Paul F. McLaughlin, Ambler, PA (US); Jay M. Doyle, Newtown, PA (US)

(73) Assignee: Honeywell International Inc., Morristown, NJ (US)

( * ) Notice: Subject to any disclaimer, the term of this patent is extended or adjusted under 35 U.S.C. 154(b) by 1454 days.

(21) Appl. No.: 11/429,093

(22) Filed: May 5, 2006

(65) Prior Publication Data

US 2007/0261052 A1 Nov. 8, 2007

(51) Int. Cl.
*G06F 9/44* (2006.01)
*G06F 9/445* (2006.01)

(52) U.S. Cl. ........ 717/174; 717/168; 717/170; 717/171; 717/172; 717/173; 717/176; 717/177; 717/178

(58) Field of Classification Search .................. None
See application file for complete search history.

(56) References Cited

U.S. PATENT DOCUMENTS

| | | | |
|---|---|---|---|
| 5,664,195 A | | 9/1997 | Chatterji |
| 6,292,905 B1* | | 9/2001 | Wallach et al. .................. 714/4 |
| 6,374,352 B1 | | 4/2002 | Goldman et al. |
| 6,694,447 B1* | | 2/2004 | Leach et al. ....................... 714/6 |
| 6,701,453 B2* | | 3/2004 | Chrabaszcz .................... 714/13 |
| 7,058,848 B2* | | 6/2006 | Sicola et al. ........................ 714/4 |
| 7,240,188 B2* | | 7/2007 | Takata et al. ........................ 713/1 |
| 2003/0177150 A1* | | 9/2003 | Fung et al. ..................... 707/204 |
| 2005/0071708 A1* | | 3/2005 | Bartfai et al. ...................... 714/5 |
| 2005/0102562 A1* | | 5/2005 | Shinohara et al. ............... 714/15 |
| 2005/0289553 A1* | | 12/2005 | Miki ............................. 718/104 |
| 2006/0015641 A1* | | 1/2006 | Ocko et al. .................... 709/236 |
| 2006/0271814 A1* | | 11/2006 | Fung et al. ......................... 714/4 |
| 2007/0022317 A1* | | 1/2007 | Chen et al. ......................... 714/6 |
| 2007/0147294 A1* | | 6/2007 | Bose et al. .................... 370/329 |
| 2008/0140844 A1* | | 6/2008 | Halpern ........................ 709/226 |

FOREIGN PATENT DOCUMENTS

DE 4134207 C1 4/1993

OTHER PUBLICATIONS

Communication pursuant to Article 94(3) EPC dated Apr. 2, 2009 in connection with European Patent Application No. 07 761 784.3.

* cited by examiner

*Primary Examiner* — Insun Kang

(57) ABSTRACT

A method includes receiving a request to install a software release, where the software release is to be installed on a first device and/or a second device. The method also includes initiating installation of the software release on the second device and determining whether or not a user wishes to continue with the installation of the software release. The method further includes initiating installation of the software release on the first device if the user wishes to continue. In addition, the method includes restoring a second software release on the second device if the user does not wish to continue. The first and second devices may represent redundant devices, such as a redundant set of controllers in a process control system or a redundant set of I/O modules that facilitate communication between one or more controllers and one or more process elements in the process control system.

21 Claims, 10 Drawing Sheets

APPARATUS AND METHOD FOR ALLOWING A FAIL-BACK TO A PRIOR SOFTWARE RELEASE IN A PROCESS CONTROL SYSTEM

TECHNICAL FIELD

This disclosure relates generally to control systems. More specifically, this disclosure relates to an apparatus and method for allowing a fail-back to a prior software release in a process control system, which may include maintaining control of a process during the fail-back.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

In conventional process control systems, it is often necessary or desirable to update the software being executed by the controllers. The process of updating the software is generally referred to as "migration." Also, different software or versions of software are generally referred to as "software releases." The migration of a process control system to a new software release is often a critical operation because it has the potential of significantly affecting (or even stopping) the operation of a processing facility. Also, the migration of a process control system to a new software release typically needs to be done in a way that preserves the functionality and behavior of the process control system from one software release to the next.

SUMMARY

This disclosure provides an apparatus and method for allowing a fail-back to a prior software release in a process control system, which may include maintaining control of a process during the fail-back.

In a first embodiment, a method includes receiving a request to install a software release, where the software release is to be installed on a first device and/or a second device. The method also includes initiating installation of the software release on the second device and determining whether or not a user wishes to continue with the installation of the software release. The method further includes initiating installation of the software release on the first device if the user wishes to continue with the installation. In addition, the method includes restoring a second software release on the second device if the user does not wish to continue with the installation.

In particular embodiments, the first and second devices represent controllers operable to control a process. The process is controlled by at least one of the controllers throughout the installation of the software release and the restoration of the second software release.

In other particular embodiments, the first and second devices represent redundant devices. The first device acts as a primary device and the second device acts as a backup device during installation of the software release on the second device. The method also includes causing the second device to act as the primary device and the first device to act as the backup device after installation of the software release on the second device. The method further includes causing the second device to act as the backup device and the first device to act as the primary device during restoration of the second software release on the second device.

In a second embodiment, an apparatus includes at least one memory operable to store a software release. The apparatus also includes at least one processor operable to receive a request to install the software release, where the software release is to be installed on a first device and/or a second device. The at least one processor is also operable to initiate installation of the software release on the second device and to determine whether or not a user wishes to continue with the installation of the software release. The at least one processor is further operable to initiate installation of the software release on the first device if the user wishes to continue with the installation. In addition, the at least one processor is operable to restore a second software release on the second device if the user does not wish to continue with the installation.

In a third embodiment, a computer program is embodied on a computer readable medium and is operable to be executed by a processor. The computer program includes computer readable program code for receiving a request to install a software release, where the software release is to be installed on a first device and/or a second device. The computer program also includes computer readable program code for initiating installation of the software release on the second device and determining whether or not a user wishes to continue with the installation of the software release. The computer program further includes computer readable program code for initiating installation of the software release on the first device if the user wishes to continue with the installation. In addition, the computer program includes computer readable program code for restoring a second software release on the second device if the user does not wish to continue with the installation.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
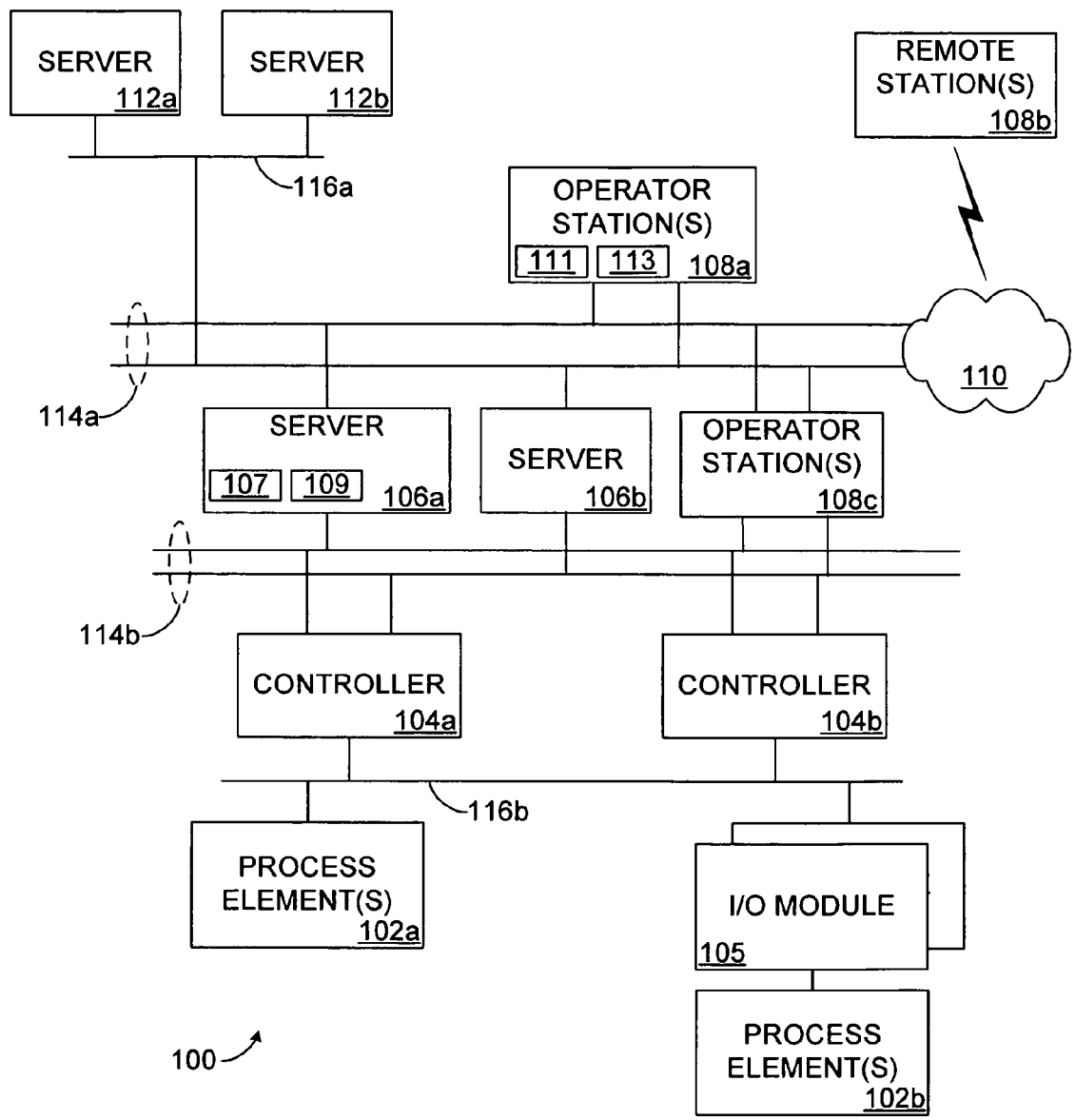
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. Each of the controllers 104a-104b includes any hardware, software, firmware, or combination thereof for controlling one or more of the process elements 102a-102b. Example controllers 104a-104b could include C300 controllers and SERIES C FIMs from HONEYWELL INTERNATIONAL INC.

Optionally, one or more input/output (I/O) modules 105 could operate between the controllers 104a-104b and one or more of the process elements 102a-102b (in this example, one or more process elements 102b). Each I/O module 105 facilitates communication between the controllers 104a-104b and the process element(s) 102b. For example, an I/O module 105 could represent a data acquisition device that receives data from a controller and provides the data to a process element. The I/O module 105 could also receive data from the process element and provide the data to the controller. Each I/O module 105 includes any hardware, software, firmware, or combination thereof for facilitating communication between controllers and process elements. The I/O module 105 could, for example, represent a SERIES C IOM from HONEYWELL INTERNATIONAL INC. Also, as shown in FIG. 1, the I/O modules 105 could operate in redundant groups.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. Each of the servers 106a-106b could, for example, include one or more processors 107 and one or more memories 109 storing data and instructions used by the processor(s) 107 (such as software executed by the controllers 104a-104b). In particular embodiments, the servers 106a-106b could represent personal computers (such as desktop computers) executing a MICROSOFT WINDOWS operating system. In other particular embodiments, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processors 111 and one or more memories 113 storing data and instructions used by the processor(s) 111 (such as software executed by the controllers 104a-104b). In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116b that support communication between components in the system 100. Each of these networks 114a-114b, 116a-116b represents any suitable network or combination of networks facilitating communication between components in the system 100. The networks 114a-114b, 116a-116b could, for example, represent Ethernet networks.

In one aspect of operation, the controllers 104a-104b execute logic in the form of software. Also, the controllers 104a-104b may operate as redundant controllers in the process control system 100. For example, the controller 104a could function as the primary controller, which means the controller 104a functions as the primary or main controller of the process elements 102a-102b. The controller 104b could function as the backup or secondary controller, which means the controller 104b could be synchronized with the controller 104a and take over control of the process elements 102a-102b when necessary (such as during a failure of the controller 104a).

A user may wish to install new software on the controllers 104a-104b. In this document, the term "software" encompasses any logic executed by processors, controllers, servers, or other devices, including instructions or other logic in the form of firmware. Also, the term "release" refers to different software or versions of software. As an example, a user using one of the operator stations 108a-108c could initiate a download of a new software release onto the controllers 104a-104b. According to this disclosure, the migration to a new software release may occur as follows. The new software release is installed on the secondary or backup controller 104b, and the backup controller 104b is switched to act as the primary controller of the process elements 102a-102b. At this point, the user may evaluate the new software release. If the user is satisfied with the new software release, the new software release is loaded onto the other controller 104a. Otherwise, the other controller 104a becomes the primary controller of the process elements 102a-102b, and a prior software release is restored (re-installed, re-loaded, etc.) on the controller 104b.

In this way, the user may evaluate the new software release and identify any problems with the new software release using the controller 104b (such as unexpected behavior by the controller 104b). If problems are detected, the user may "fail back" or return to the prior software release on the controller 104b, while the controller 104a controls the process elements 102a-102b. Because of this, the process elements 102a-102b may be continuously controlled by one of the controllers 104a-104b, even while the user is evaluating a new software release and possibly failing back to a prior software release.

The migration and fail-back functionality described above is not limited to use with redundant controllers. The same or similar functionality could be used to load a new software release onto any redundant set of devices in the process control system 100, such as the I/O modules 105. Also, in particular embodiments, the migration and fail-back functionality described above may be implemented using a migration "wizard" or other application for use by a user. For example, the migration wizard may present user interfaces to the user, where the user interfaces facilitate the migration and fail-back functions. As a particular example, the migration wizard could represent an application executed or supported by one or more of the operator stations 108a-108c or one or more of the servers in the system 100 (such as servers 106a-106b). Additional details regarding the operation of the migration wizard or other application are shown in FIGS. 2 through 7, which are described below.

Although FIG. 1 illustrates one example of a process control system 100, various changes may be made to FIG. 1. For example, a control system could include any number of process elements, controllers, servers, and operator stations. Also, FIG. 1 illustrates one operational environment in which migration to a new software release and fail-back to a prior software release can be used. The migration and fail-back mechanisms could be used in any other suitable device or system.

Figure 2:
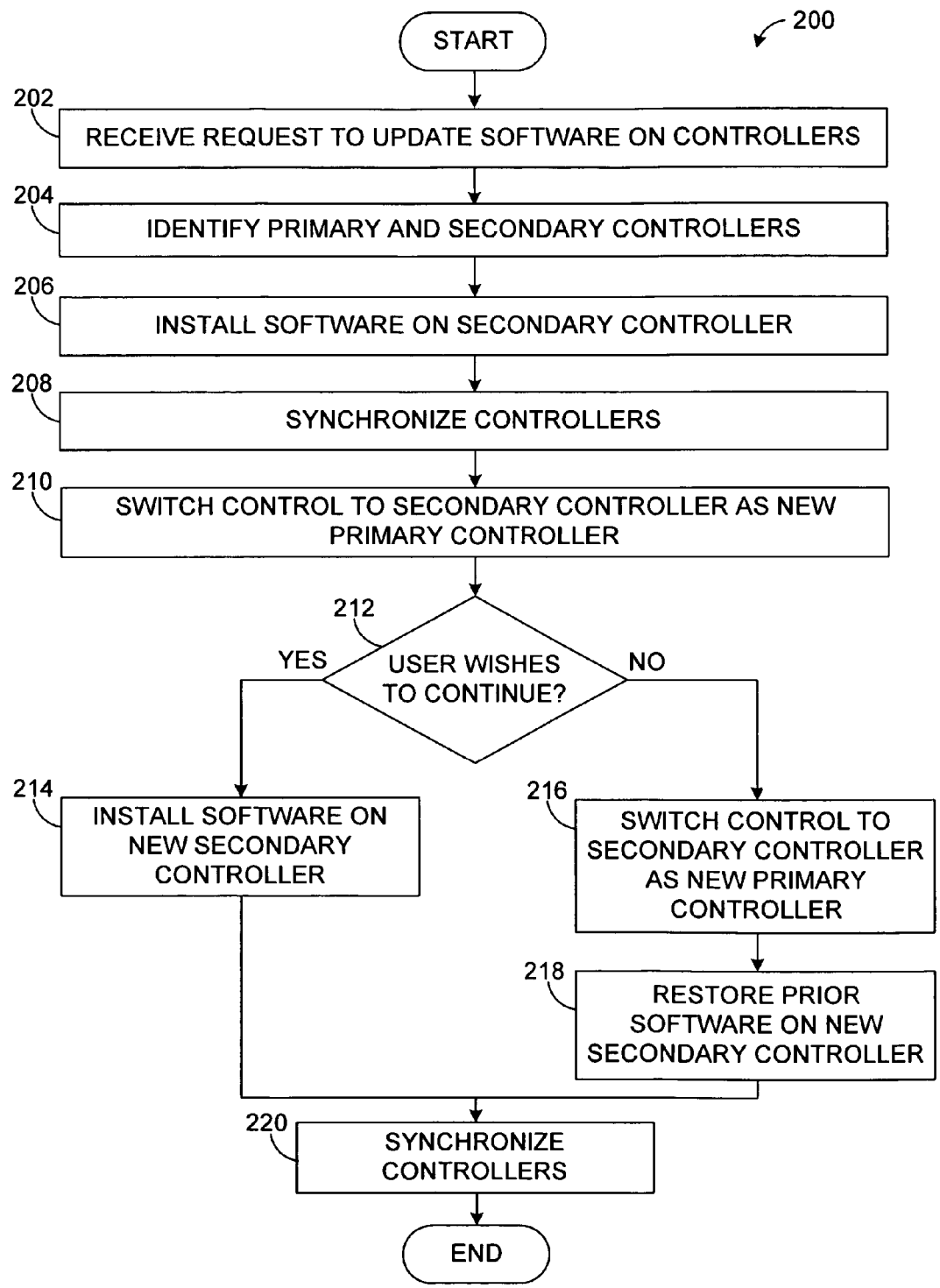
FIG. 2 illustrates an example method for allowing a fail-back to a prior software release in a process control system according to one embodiment of this disclosure.

FIG. 2 illustrates an example method 200 for allowing a fail-back to a prior software release in a process control system according to one embodiment of this disclosure. For ease of explanation, the method 200 is described as being performed by a migration wizard executed on the operator station 108a to control a software migration in the controllers 104a-104b in the process control system 100 of FIG. 1. The method 200 could be used by any suitable device and in any suitable system to support any suitable software migration.

The migration wizard receives a request to update the software on redundant controllers at step 202. This may include, for example, a user invoking the migration wizard directly or indirectly from other applications being used by the user for other functions. As particular examples, the user could invoke the migration wizard from a CONTROL BUILDER application from HONEYWELL INTERNATIONAL INC. In this step, the user could also identify the software release to be loaded onto the controllers. The release selected by the user may be referred to as a "target" software release.

The migration wizard identifies which controller is a primary controller and which controller is a secondary controller at step 204. In this example, the controller 104a could represent the primary controller, and the controller 104b could represent the secondary controller.

The migration wizard installs software on the secondary controller at step 206. This may include, for example, the migration wizard transmitting the target software release to the secondary controller 104b over the network 114b. This may also include the secondary controller 104b receiving, storing, and executing the target software release.

The migration wizard synchronizes the primary and secondary controllers at step 208. Any suitable synchronization technique could be used to synchronize the controllers 104a-104b. For example, before step 204, the migration wizard could initiate a snapshot of the primary controller's data, which captures the current values of the data used by the primary controller 104a to control the process elements 102a-102b. The migration wizard could also disable the synchronization of data between the primary and secondary controllers (meaning changes to data in the controller 104a are not replicated at the controller 104b). During step 208, the migration wizard may load the snapshot of the primary controller's data into the secondary controller 104b. The migration wizard may also enable the synchronization of data between the primary and secondary controllers. The loading of the snapshot may bring the secondary controller 104b to a state at or near the current state of the primary controller 104a. Enabling the synchronization of data between the controllers 104a-104b may allow other changes to the primary controller's data (such as changes since the snapshot) to be made at the secondary controller 104b.

The migration wizard switches control in the process system to the secondary controller (which now becomes the primary controller) at step 210. This may include, for example, the migration wizard causing the controller 104b to become the primary controller. This may also include the migration wizard causing the controller 104a to become the secondary controller, such as by placing the controller 104a in a standby or backup mode.

The user is given the option of continuing with the migration at step 212. At this point, the controller 104b is the primary controller and operates using the target software release. The user may observe the operation of the controller 104b and determine if the target software release is operating properly. For example, the user could run tests or perform other actions to determine if the target software release is operating properly or if any errors occur. In particular embodiments, the prior software release (previously used by the controller 104b and still used by the controller 104a) and the target software release support release interoperability. This allows different controllers using different software releases to interoperate in a well-behaved, full-functioned, and possibly long-term manner.

If the user wishes to continue with the migration, the migration wizard installs the software on the new secondary controller at step 214 and synchronizes the controllers at step 220. This may include, for example, the migration wizard providing the target software release to the controller 104*a*, which is now the secondary controller of the process elements 102*a*-102*b*. This may also include the migration wizard disabling the synchronization of data between the controllers 104*a*-104*b*, upgrading the software in the controller 104*a*, and enabling the synchronization of data between the controllers 104*a*-104*b*. At this point, both controllers 104*a*-104*b* are operating using the target software release.

If the user does not wish to continue with the migration at step 212, the migration wizard switches control in the process system to the secondary controller (which now becomes the primary controller) at step 216. This may include, for example, the migration wizard causing the controller 104*a* to become the primary controller and the controller 104*b* to become the secondary controller. The migration wizard also restores the prior software on the secondary controller at step 218 and synchronizes the controllers at step 220. This may include, for example, the migration wizard restoring the prior software release on the controller 104*b*, which is now the secondary controller of the process elements 102*a*-102*b*. This may also include the migration wizard disabling the synchronization of data between the controllers 104*a*-104*b*, restoring the software on the controller 104*b*, and enabling the synchronization of data between the controllers 104*a*-104*b*. At this point, both controllers 104*a*-104*b* are operating using the prior software release.

In this way, the user is able to view how a new software release behaves in a process control system. Once the new software release is loaded onto a controller and is functioning, the user is given the option of either installing the new software release on the other controller or returning (failing back) to the prior software release. All of this may occur while the process elements 102*a*-102*b* are being managed and controlled by one of the controllers 104*a*-104*b*. As a result, the software migration could occur without a user ever losing visibility into or control over the process elements 102*a*-102*b*.

Although FIG. 2 illustrates one example of a method 200 for allowing a fail-back to a prior software release in a process control system, various changes could be made to FIG. 2. For example, while shown as a series of steps, various steps in FIG. 2 could overlap, occur in parallel, or occur in a different order. Also, while described as loading a new software release onto redundant controllers, the method 200 could be used to load software onto any suitable redundant devices. As a particular example, the method 200 could be used to load software onto one or more I/O modules 105.

FIGS. 3 through 6C illustrate example user interfaces supporting migration to a new software release in a process control system according to one embodiment of this disclosure. For ease of explanation, the user interfaces shown in FIGS. 3 through 6C are described as being used by a migration wizard executed on the operator station 108*a* to control a software migration in the process control system 100 of FIG. 1. The user interfaces shown in FIGS. 3 through 6C could be used by any suitable device and in any suitable system to support any suitable software migration.

Figure 3:
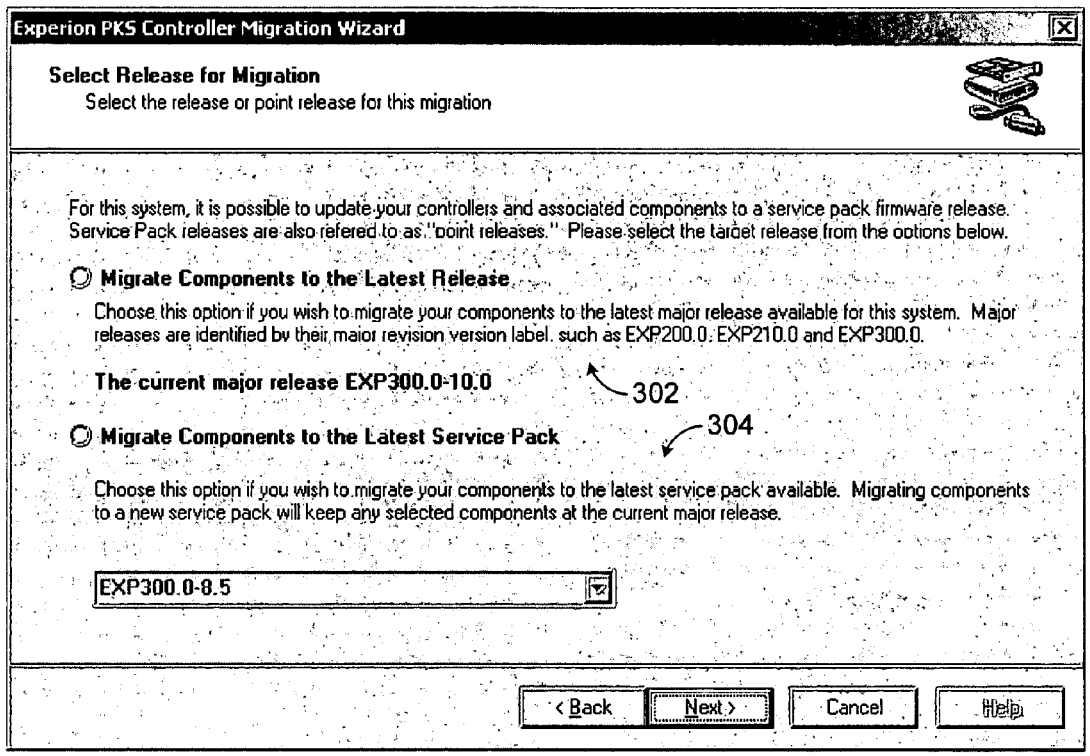
FIGS. 3 through 6C illustrate example user interfaces supporting migration to a new software release in a process control system according to one embodiment of this disclosure.

As shown in FIG. 3, the migration wizard may present a release selection interface 300 to a user. The release selection interface 300 allows the user to select the target software release to be loaded onto one or more devices (such as controllers 104*a*-104*b*). In this example, the user is given two options 302-304. In the first option 302, the user may choose to load the latest major software release onto the devices. In the second option 304, the user may choose a service pack from a drop-down menu, where the service pack represents an upgrade to a previous major software release.

Once the user selects the target release, the migration wizard identifies all of the modules associated with the controllers 104*a*-104*b*. The associated modules could include I/O modules (such as modules 105) and gateways connected to the controllers 104*a*-104*b*. Information for each identified module is then obtained to determine if that module has software to be migrated, such as by determining if each module uses any software release older than the target release selected by the user. The migration wizard may perform this discovery process while displaying the interface 300 or a separate interface (such as a window stating that the associated modules are being identified). Because the discovery process may take a relative longer period of time, a status indicator could also be displayed to a user, such as a bar identifying how much of the discovery process has been completed or how much of the discovery process remains.

Figure 4:
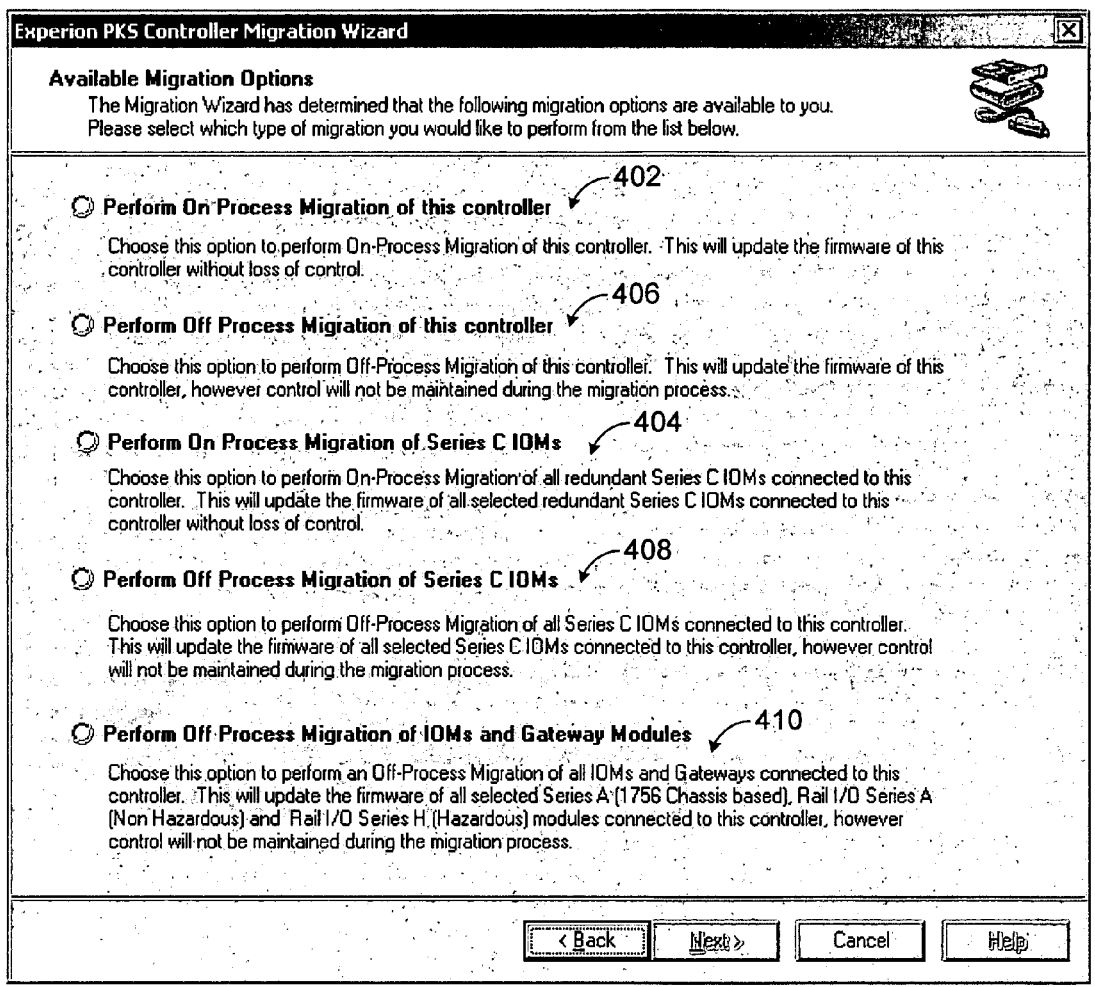

Once the associated modules are identified, the migration wizard may present a migration selection interface 400 to the user as shown in FIG. 4. The migration selection interface 400 allows the user to select the type of migration to be performed. In this example, the user is given five options 402-410. The first two options 402-404 may be selected by the user to initiate an "on-process" migration for controllers or associated I/O modules, respectively. Selection of these options 402-404 may initiate the migration and fail-back functionality described above.

Selection of the other options 406-410 may initiate migration of software without the fail-back functionality described above. For example, the options 406-410 may allow software to be loaded onto redundant or non-redundant devices, but the user may lose visibility into and control over the process elements 102*a*-102*b* during the installation. Also, the user may not be given the option of failing back to a prior software release. These types of software migrations are referred to as "off-process" migrations.

Figure 5A:
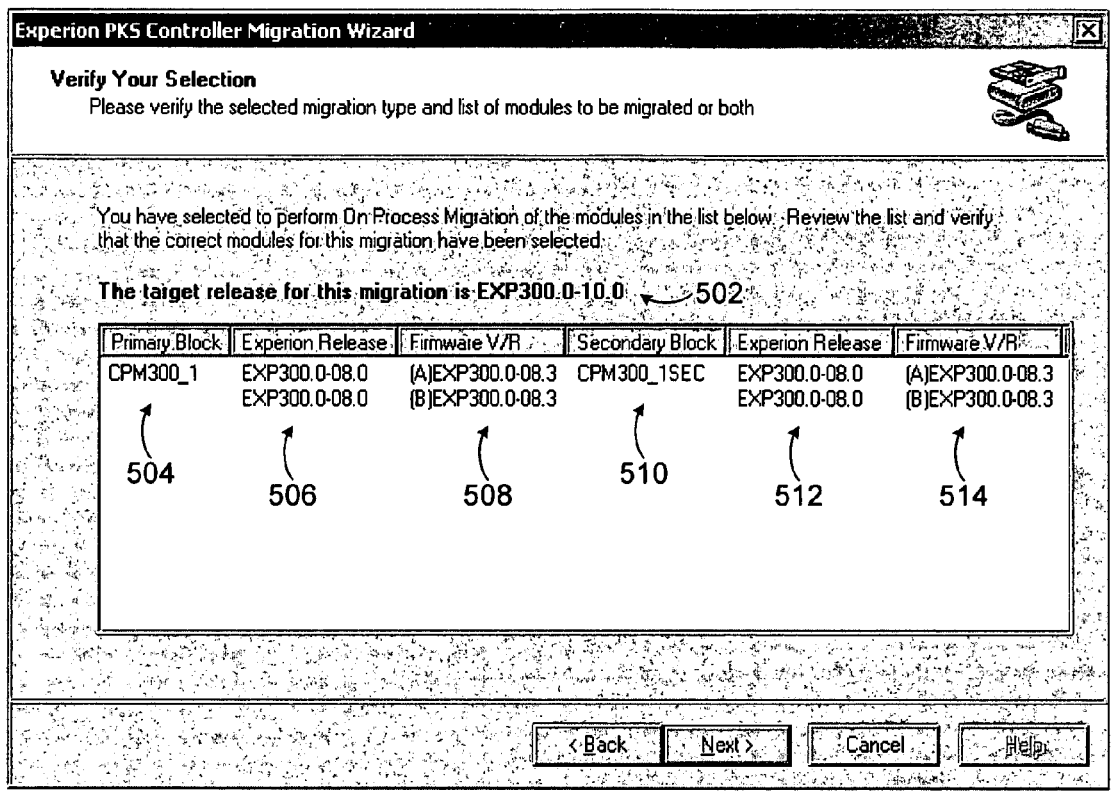

If the user selects option 402 (perform an "on-process" software migration for controllers), the migration wizard may present a verification interface 500 to the user as shown in FIG. 5A. The verification interface 500 allows the user to verify that the target software release will be installed on the appropriate devices (in this case, redundant controllers). In this example, the verification interface 500 identifies the target release 502 previously selected by the user.

The verification interface 500 also identifies various information about the redundant controllers. For example, the verification interface 500 identifies the name 504 of the primary controller, the current software release 506 installed on the primary controller, and the current application firmware version revision (denoted "(A)") and the current boot firmware version revision (denoted "(B)") 508 of the primary controller. The verification interface 500 also identifies the name 510 of the secondary controller, the current software release 512 installed on the secondary controller, and the current application firmware version revision and boot firmware version revision 514 of the secondary controller. In addition, for each firmware version revision identified, the verification interface 500 could indicate whether that firmware differs from the target release 502.

The information presented in the verification interface 500 allows the user to verify the migration of software for the identified controllers. The user has the option of continuing with the migration or going back to make changes to the planned migration. In particular embodiments, the verification interface 500 could be used to verify the migration for controllers such as C300 controllers and SERIES C FIMs.

Figure 5B:
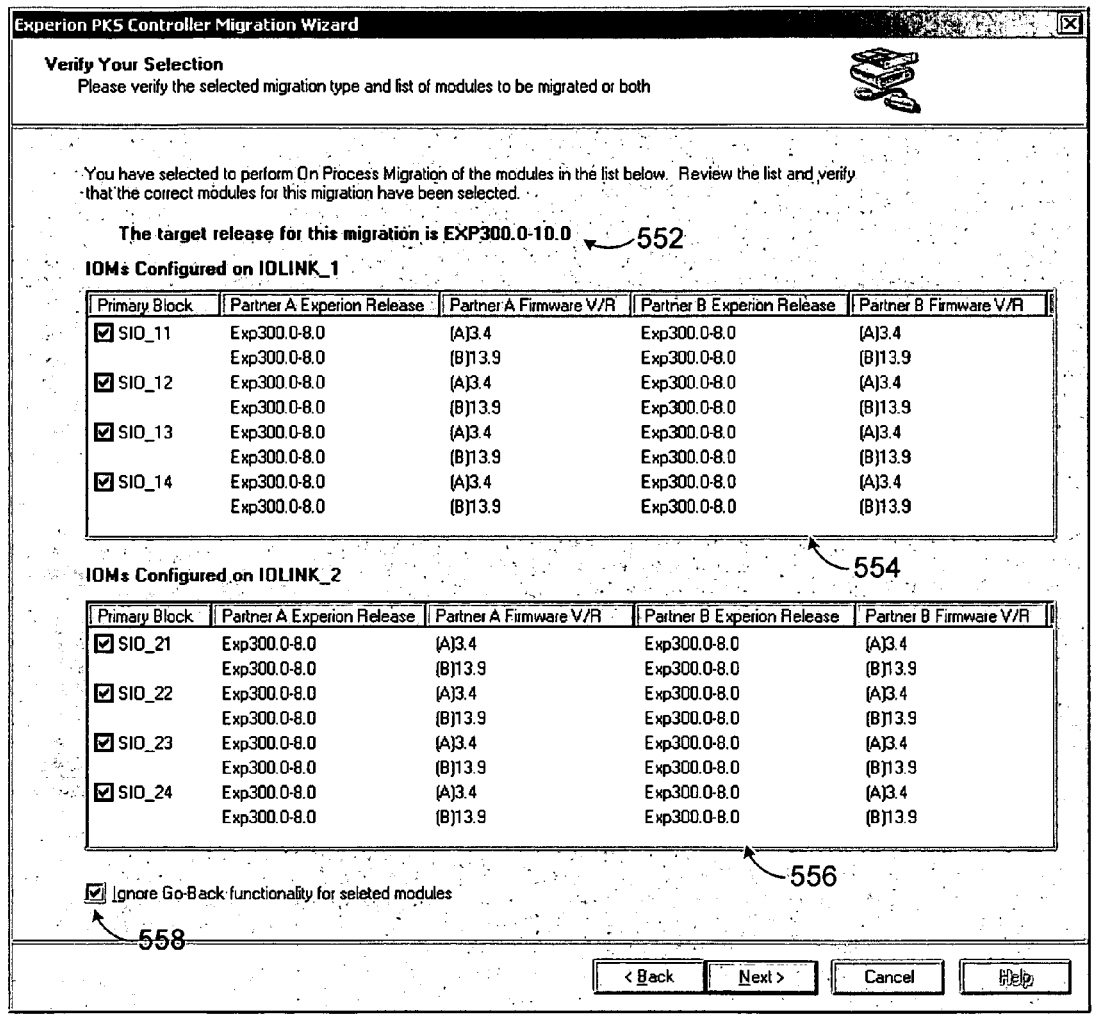

If the user selects option 404 (perform an "on-process" software migration for I/O modules), the migration wizard may present a verification interface 550 to the user as shown in FIG. 5B. In this example, the verification interface 550 identifies the target release 552 selected by the user.

The verification interface 550 also identifies the I/O modules 105 connected to a controller and the planned migration of software for those I/O modules 105. In this example, the verification interface 550 includes two different sections 554-556, where each section identifies the I/O modules 105 connected to a different link of the controller. In some embodiments, a controller (such as controller 104b) could have one or multiple links over which the controller communicates with the I/O modules 105, and one or multiple I/O modules 105 could be coupled to each link of the controller.

As shown in FIG. 5B, each of the sections 554-556 contains various information about the I/O modules 105 coupled to a different link of a controller. In this particular example, a redundant pair of I/O modules 105 is identified using a "primary block" name, and the individual I/O modules 105 themselves are denoted "Partner A" and "Partner B". For each I/O module 105, the verification interface 550 identifies the current software release, current application firmware version revision, and current boot firmware version revision of that I/O module 105. For each firmware version revision identified, the verification interface 550 could indicate whether that firmware differs from the target release 552. In addition, the verification interface 550 includes a checkbox 558. As described in more detail below, the checkbox 558 may be used to enable or disable the fail-back functionality for individual I/O modules 105.

The information presented in the verification interface 550 allows the user to verify the migration of software for the identified I/O modules 105. The user has the option of continuing with the migration or going back to make changes to the migration. In particular embodiments, the verification interface 550 could be used to verify the migration for I/O modules such as SERIES C IOMs.

Figure 6A:
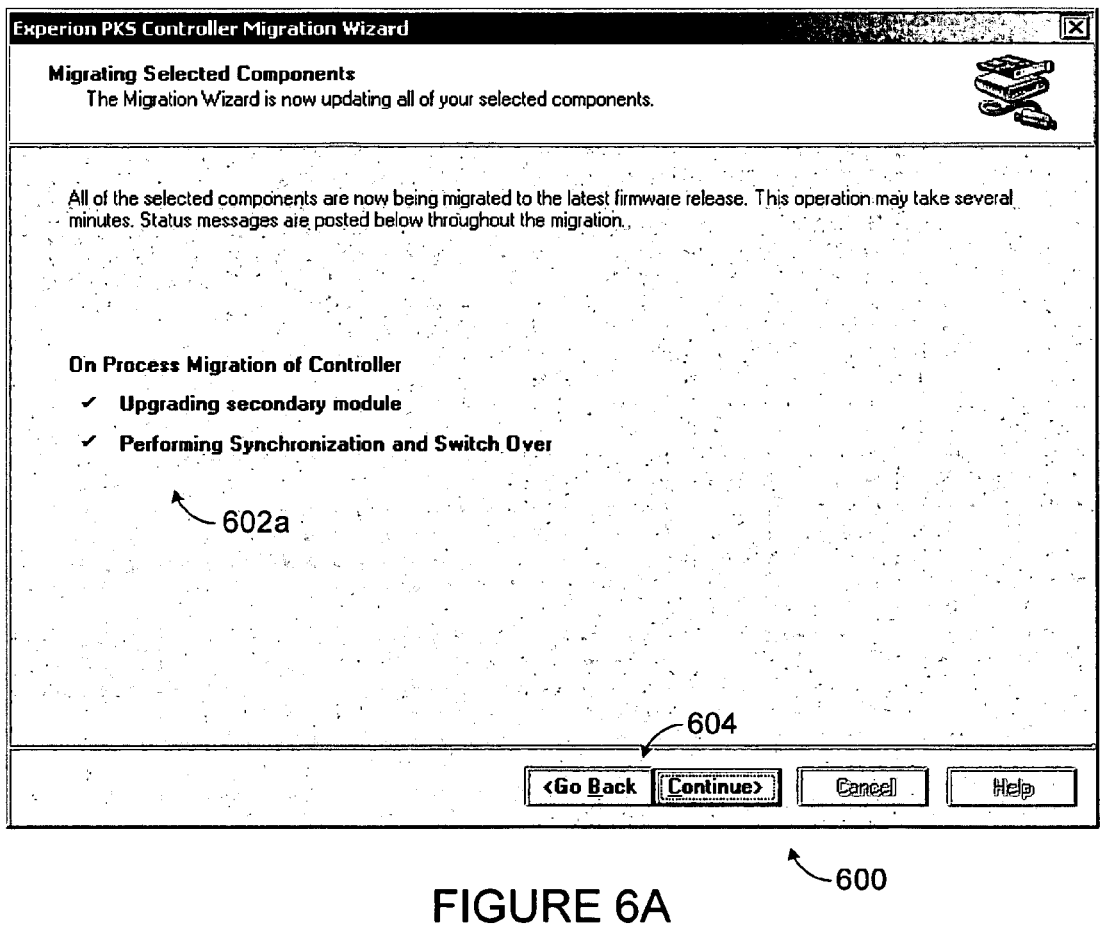

Once the user verifies a software migration using the verification interface 500 or the verification interface 550, the user may be presented with a migration status interface 600 as shown in FIG. 6A. The migration status interface 600 includes a list 602a identifying different operations performed during a software migration and the status of each operation. In this example, the status of a software migration for redundant controllers 104a-104b is shown. The first step of the migration process involves loading a target software release onto the secondary controller (such as controller 104b). The second step of the migration process involves synchronizing the controllers 104a-104b and transferring control of a process to the controller 104b (which then becomes the primary controller).

As part of the synchronization of the controllers 104a-104b, a snapshot of the data used by the controller 104a could be loaded into the controller 104b. In particular embodiments, the snapshot is used with C300 controllers. Any errors during the loading of the snapshot could be displayed to the user, allowing the user to decide whether to continue with the migration. Also, in particular embodiments, indirect synchronization may be used with C300 controllers. In addition, in particular embodiments, transferring control may involve placing the primary controller 104a in standby mode (for C300 controllers) or in backup mode (for SERIES C FIMs).

Once these migration steps are completed, the migration status interface 600 provides different options for the user. In this example, the options are provided in the form of buttons 604. First, the user may "continue" with the migration, which would install the target software release on the other controller 104a. Second, the user may "go back," which would initiate a fail-back to a prior software release on the controller 104b.

Figure 6B:
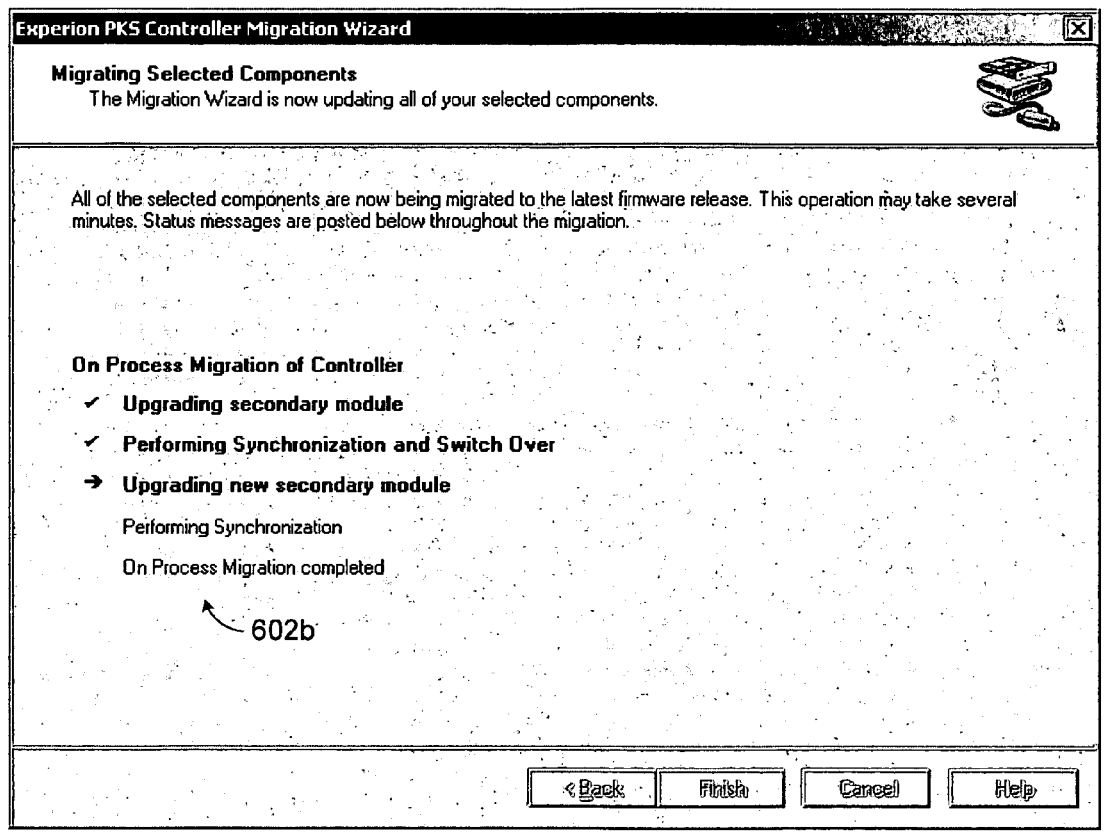

If the user selects the "continue" button 604 in the migration status interface 600, the list 602a in the migration status interface 600 expands into a list 602b as shown in FIG. 6B. In this example, the migration process completes after the performance of two additional steps. One additional step involves loading the target software release onto the new secondary controller (such as controller 104a). The other additional step involves synchronizing the controllers 104a-104b. At this point, both controllers 104a-104b have been upgraded with the target software release and have been synchronized.

Figure 6C:
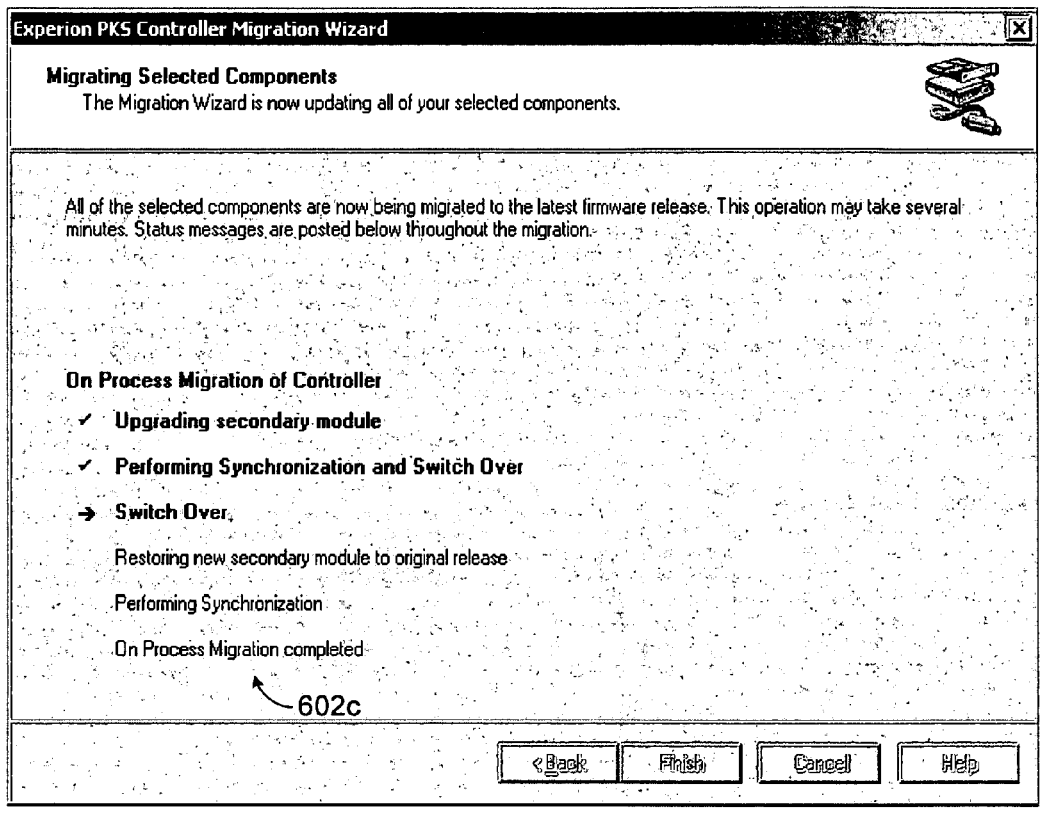

If the user selects the "go back" button 604 in the migration status interface 600, the list 602a in the migration status interface 600 expands into a list 602c as shown in FIG. 6C. In this example, the migration wizard performs three additional steps to fail back to the prior software release on the controllers 104a-104b. In this example embodiment, the first additional step involves switching control of the process over to the new secondary controller (which was previously the primary controller, such as controller 104a). The second additional step involves restoring the new secondary controller 104b to a prior software release. The third additional step involves synchronizing the controllers 104a-104b. In this case, the user is able to "fail back" to the prior software release, and both controllers 104a-104b are operating using the prior software release.

A similar migration status interface 600 may be used when migrating software for I/O modules 105. In this case, the migration status interface 600 in FIG. 6A may identify each secondary I/O module 105 during the software migration for that I/O module 105. As each secondary I/O module 105 is upgraded, the user may be given the option to either "continue" with the migration (upgrade the next secondary I/O module 105) or "go back" to a prior software release. If the user selects the "go back" button 604 for any I/O module 105, that I/O module 105 may be restored to its prior software release, and the user may be asked whether to continue with the rest of the I/O modules 105 or to cancel the remainder of the migration. Once all of the secondary I/O modules 105 have been upgraded with the target software release and switched to primary I/O modules 105, the user may be given the option of continuing with the migration. If selected, each new secondary I/O module 105 (previously a primary I/O module that has not been upgraded) is upgraded and synchronized as shown in FIG. 6B. If the migration is cancelled or the user indicates a desire to not continue with the migration, a fail back occurs for each upgraded I/O module 105 as shown in FIG. 6C. A status indicator may be used throughout the migration process to identify the number of I/O modules 105 upgraded or remaining to be upgraded. In some embodiments, the user may not be asked after each I/O module upgrade if he or she wishes to fail back to a prior software release (based on whether the user selected the checkbox 558 in the verification interface 550).

Although FIGS. 3 through 6C illustrate examples of user interfaces supporting migration to a new software release in a process control system, various changes may be made to FIGS. 3 through 6C. For example, user interfaces that support additional functionality could be used in the system 100 or in any other suitable device or system. Also, the content and arrangement of the user interfaces in FIGS. 3 through 6C are for illustration and explanation only. Other user interfaces that provide the same or similar functionality may be used, even if those interfaces have different content or arrangement.

Figure 7:
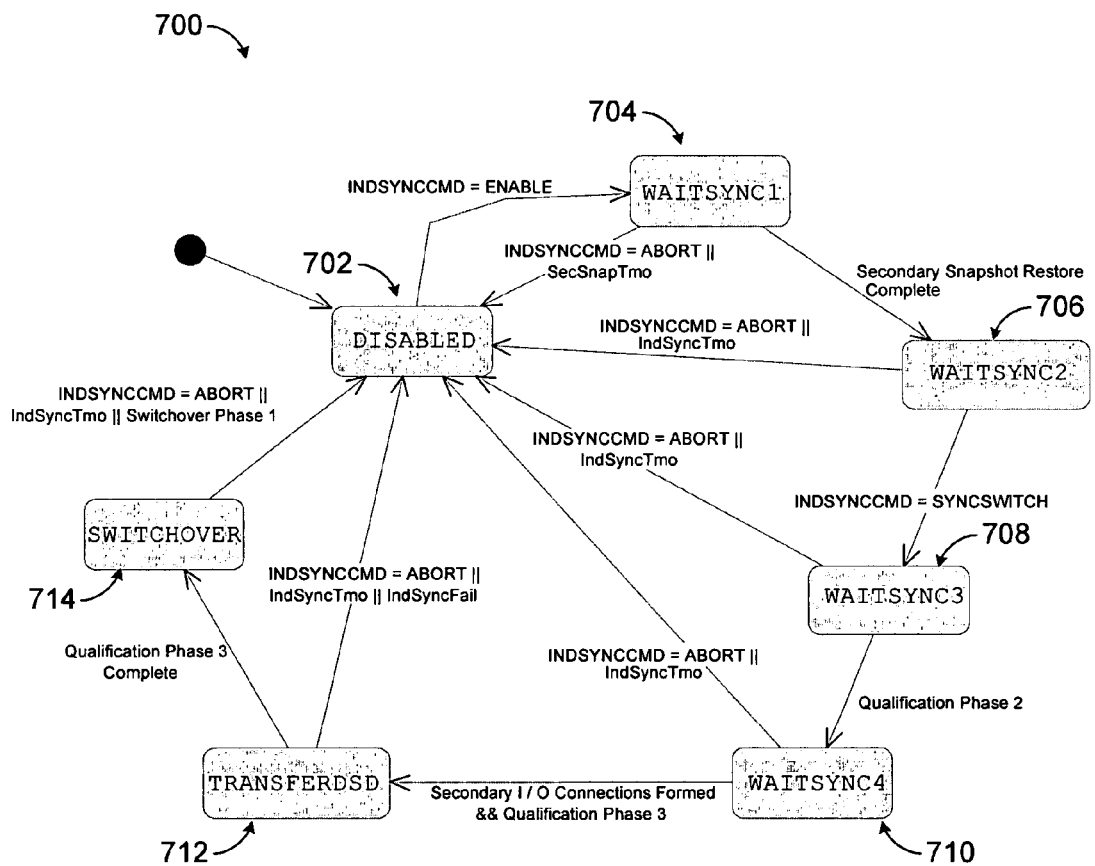
FIG. 7 illustrates an example state machine used to perform migration to a new software release in a process control system according to one embodiment of this disclosure.

FIG. 7 illustrates an example state machine 700 used to perform migration to a new software release in a process control system according to one embodiment of this disclosure. For ease of explanation, the state machine 700 is described as being used to control a software migration in the controllers 104a-104b in the process control system 100 of FIG. 1. The state machine 700 could be used by any suitable device and in any suitable system to support any suitable software migration.

As shown in FIG. 7, the state machine 700 includes seven states 702-714, and logic or conditions are used to transition between the states 702-714. In this example, the state 702 generally indicates that an on-process migration is not occurring. The state 704 generally indicates that an on-process migration has begun and that the state machine 700 is waiting to restore a snapshot of a primary controller's data at a secondary controller (this state may be skipped if snapshots are not used). The state 706 generally indicates that the state machine 700 is waiting to issue a command enabling synchronization and switchover between the primary and secondary controllers. The state 708 generally indicates that the state machine 700 is waiting for synchronization between the controllers to occur. The state 710 generally indicates that the state machine 700 is waiting for the formation of I/O connections between the secondary controller and any I/O modules 105 to complete. The state 712 generally indicates that dynamic state data (DSD) is being transferred from the primary controller 104a to the secondary controller 104b. The state 714 generally indicates that a switchover from the primary controller 104a to the secondary controller 104b is being requested.

Among others, a parameter INDSYNCCMD may be used to control the transitions between the states 702-714. In this example, the INDSYNCCMD parameter may have one of three values. An "ENABLE" value is used to commence an on-process migration. A "SYNCSWITCH" value is used to unleash the migration, meaning a switchover from a primary controller to a secondary controller 104b may occur. An "ABORT" value is used to terminate the migration.

The state machine 700 shown in FIG. 7 also uses other parameters. For example, the parameters SecSnapTmo and IndSyncTmo represent timeout conditions that identify if and when a step in the migration process takes an excessively long period of time. The parameter IndSyncFail represents a failure of the synchronization between the primary and secondary controllers.

Although FIG. 7 illustrates one example of a state machine 700 used to perform migration to a new software release in a process control system, various changes may be made to FIG. 7. For example, other state machines could have more or fewer states, depending on factors such as the type of device in which the migration is occurring. Also, other control mechanisms could be used instead of or in addition to the state machine 700.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   receiving a request to install a software release, the software release to be installed on at least one of: a first device and a second device;
   initiating a snapshot of data used by the first device;
   disabling synchronization of the data between the first and second devices;
   initiating installation of the software release on the second device;
   loading the snapshot of the data onto the second device after the installation of the software release on the second device;
   enabling synchronization of the data between the first and second devices after the installation of the software release on the second device;
   determining whether or not a user wishes to continue with the installation of the software release;
   if the user wishes to continue with the installation, disabling synchronization of the data between the first and second devices, initiating installation of the software release on the first device, and enabling synchronization of the data between the first and second devices after installation of the software release on the first device; and
   if the user does not wish to continue with the installation, disabling synchronization of the data between the first and second devices, restoring a second software release on the second device, and enabling synchronization of the data between the first and second devices after restoration of the second software release on the second device.

2. The method of claim 1, wherein:
the first and second devices comprise controllers operable to control one or more process elements in a process;
the data synchronized between the first and second devices comprises data values used by the controllers to control the one or more process elements; and
the one or more process elements are continuously controlled by at least one of the controllers throughout the installation of the software release and the restoration of the second software release.

3. The method of claim 1, wherein the first and second devices comprise redundant devices.

4. The method of claim 3, wherein the first device acts as a primary device and the second device acts as a backup device during installation of the software release on the second device.

5. The method of claim 4, further comprising:
causing the second device to act as the primary device and the first device to act as the backup device after installation of the software release on the second device.

6. The method of claim 5, further comprising:
causing the second device to act as the backup device and the first device to act as the primary device during restoration of the second software release on the second device.

7. The method of claim 1, wherein the software release and the second software release comprise different versions of an application.

8. The method of claim 1, wherein the first and second devices comprise one of:
a redundant set of controllers in a process control system; and
a redundant set of input/output (I/O) modules operable to facilitate communication between one or more controllers and one or more process elements in the process control system.

9. The method of claim 4, further comprising:
using a state machine having seven states to control the installation of the software release, the seven states comprising:
a disabled state in which software migration to the software release is not occurring;
a first waiting state in which the snapshot of the data is loaded onto the second device;
a second waiting state in which the state machine waits to issue a command enabling synchronization and switchover between the first and second devices;
a third waiting state in which the state machine waits for synchronization between the first and second devices;
a fourth waiting state in which the state machine waits for input/output connections associated with the second device to form;
a transfer state in which the data being synchronized is transferred between the first and second devices; and
a switchover state in which a request is made for the second device with the installed software release to begin operating as the primary device and for the first device to begin operating as the backup device.

10. The method of claim 1, wherein the second software release comprises an earlier software release executed by the second device prior to installation of the software release on the second device.

11. An apparatus, comprising:
at least one memory operable to store a software release; and
at least one processor operable to:
receive a request to install the software release, the software release to be installed on at least one of: a first device and a second device;
initiate a snapshot of data used by the first device;
disable synchronization of the data between the first and second devices;
initiate installation of the software release on the second device;
load the snapshot of the data onto the second device after the installation of the software release on the second device;
enable synchronization of the data between the first and second devices after the installation of the software release on the second device;
determine whether or not a user wishes to continue with the installation of the software release;
if the user wishes to continue with the installation, disable synchronization of the data between the first and second devices, initiate installation of the software release on the first device, and enable synchronization of the data between the first and second devices after installation of the software release on the first device; and
if the user does not wish to continue with the installation, disable synchronization of the data between the first and second devices, restore a second software release on the second device, and enable synchronization of the data between the first and second devices after restoration of the second software release on the second device.

12. The apparatus of claim 11, wherein:
the first and second devices comprise controllers operable to control one or more process elements in a process;
the data synchronized between the first and second devices comprises data values used by the controllers to control the one or more process elements; and
the one or more process elements are continuously controlled by at least one of the controllers throughout the installation of the software release and the restoration of the second software release.

13. The apparatus of claim 11, wherein the first and second devices comprise redundant devices.

14. The apparatus of claim 13, wherein the first device acts as a primary device and the second device acts as a backup device during installation of the software release on the second device.

15. The apparatus of claim 14, wherein the at least one processor is further operable to cause the second device to act as the primary device and the first device to act as the backup device after installation of the software release on the second device.

16. The apparatus of claim 15, wherein the at least one processor is further operable to cause the second device to act as the backup device and the first device to act as the primary device during restoration of the second software release on the second device.

17. The apparatus of claim 14, wherein the at least one processor is further operable to:
use a state machine having seven states to control the installation of the software release, the seven states comprising:
a disabled state in which software migration to the software release is not occurring;

a first waiting state in which the snapshot of the data is loaded onto the second device;

a second waiting state in which the state machine waits to issue a command enabling synchronization and switchover between the first and second devices;

a third waiting state in which the state machine waits for synchronization between the first and second devices;

a fourth waiting state in which the state machine waits for input/output connections associated with the second device to form;

a transfer state in which the data being synchronized is transferred between the first and second devices; and a switchover state in which a request is made for the second device with the installed software release to begin operating as the primary device and for the first device to begin operating as the backup device.

18. A computer readable medium embodying a computer program, the computer program comprising computer readable program code for:

receiving a request to install a software release, the software release to be installed on at least one of: a first device and a second device;

initiating a snapshot of data used by the first device;

disabling synchronization of the data between the first and second devices;

initiating installation of the software release on the second device;

loading the snapshot of the data onto the second device after the installation of the software release on the second device;

enabling synchronization of the data between the first and second devices after the installation of the software release on the second device;

determining whether or not a user wishes to continue with the installation of the software release;

if the user wishes to continue with the installation, disabling synchronization of the data between the first and second devices, initiating installation of the software release on the first device, and enabling synchronization of the data between the first and second devices after installation of the software release on the first device; and if the user does not wish to continue with the installation, disabling synchronization of the data between the first and second devices, restoring a second software release on the second device, and enabling synchronization of the data between the first and second devices after restoration of the second software release on the second device.

19. The computer readable medium of claim 18, wherein:

the first and second devices comprise controllers operable to control one or more process elements in a process;

the data synchronized between the first and second devices comprises data values used by the controllers to control the one or more process elements; and the one or more process elements are continuously controlled by at least one of the controllers throughout the installation of the software release and the restoration of the second software release.

20. The computer readable medium of claim 18, wherein:

the first and second devices comprise redundant devices; and the first device acts as a primary device and the second device acts as a backup device during installation of the software release on the second device.

21. The computer readable medium of claim 20, further comprising computer readable program code for:

causing the second device to act as the primary device and the first device to act as the backup device after installation of the software release on the second device; and causing the second device to act as the backup device and the first device to act as the primary device during restoration of the second software release on the second device.

\* \* \* \* \*